A. E. DURAM & F. B. HOFFT.
CONDUIT.
APPLICATION FILED AUG. 20, 1909.

1,095,315.

Patented May 5, 1914.

4 SHEETS—SHEET 1.

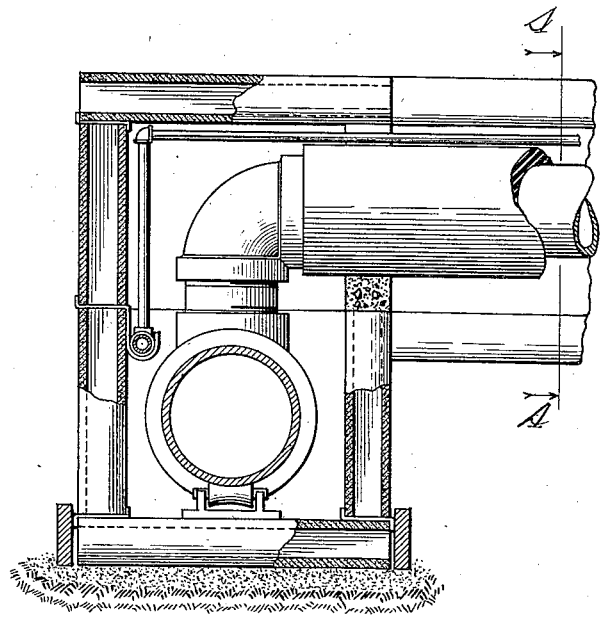
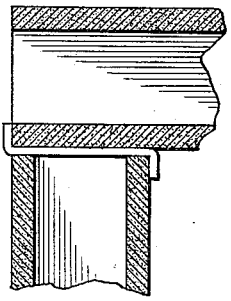
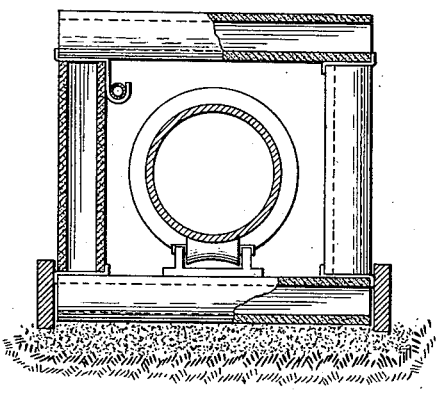
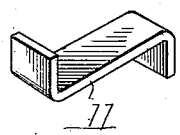

A. E. DURAM & F. B. HOFFT.
CONDUIT.
APPLICATION FILED AUG. 20, 1909.
1,095,315.
Patented May 5, 1914.
4 SHEETS—SHEET 3.
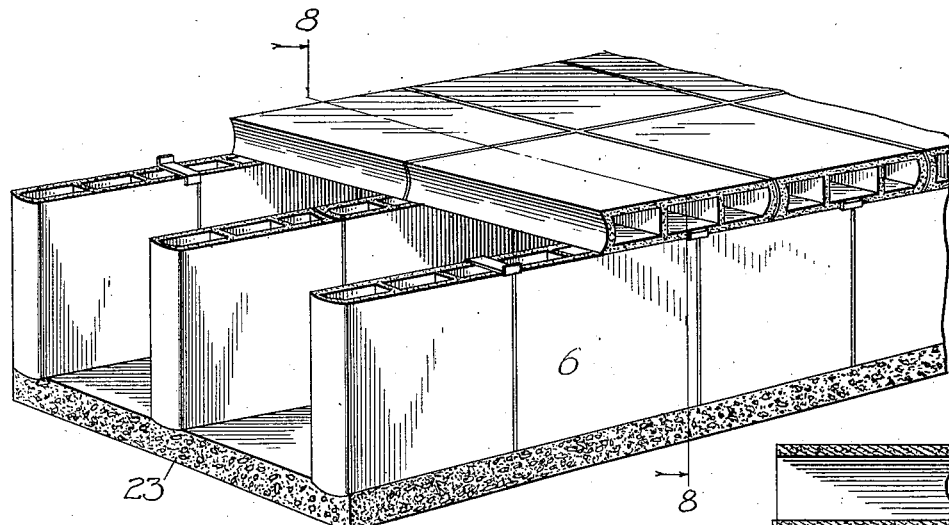
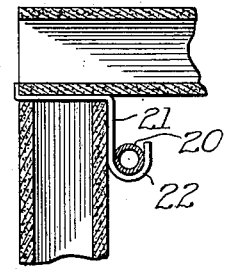
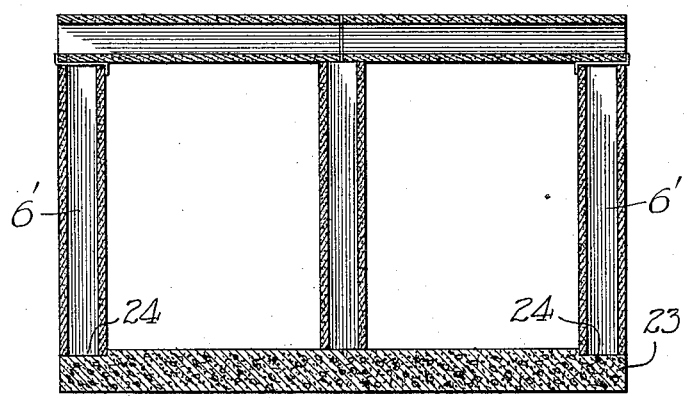

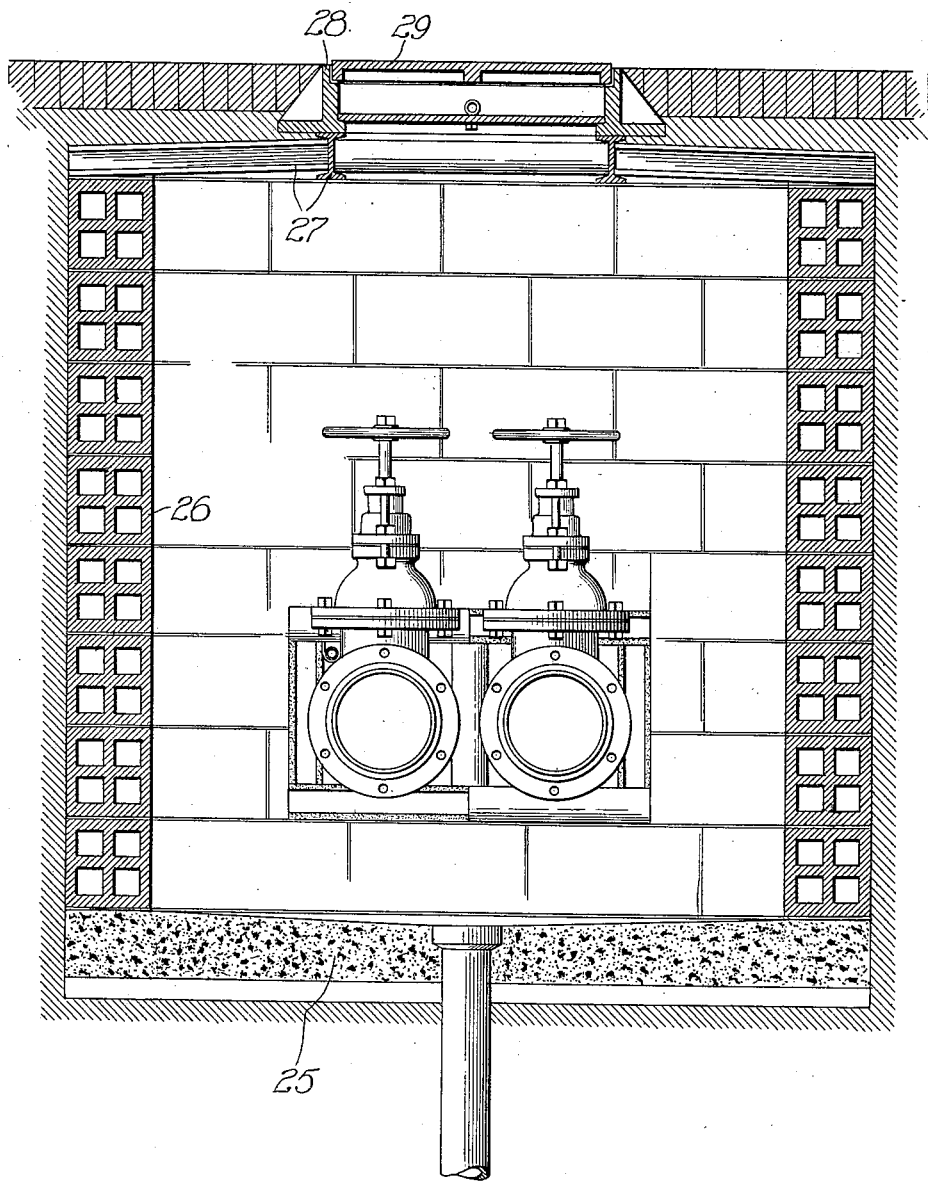

UNITED STATES PATENT OFFICE.

ARTHUR E. DURAM, OF CHICAGO, ILLINOIS, AND FREDERIC B. HOFFT, OF INDIANAPOLIS, INDIANA.

CONDUIT.

1,095,315.  Specification of Letters Patent.  Patented May 5, 1914.

Application filed August 20, 1909. Serial No. 513,741.

*To all whom it may concern:*

Be it known that we, ARTHUR E. DURAM, a citizen of the United States, residing at Chicago, in the county of Cook and State of Illinois, and FREDERIC B. HOFFT, a citizen of the United States, residing at Indianapolis, in the county of Marion and State of Indiana, have invented certain new and useful Improvements in Conduits, of which the following is a description.

Our invention relates to means for forming a passage or subway for containing electric conductors, fluid pipes, cables or the like and the object of our invention is to produce a simple, cheap and durable device of the kind described, wherein conductors positioned within the conduit are thoroughly insulated against changes in temperature.

To this end our invention consists in the novel construction, arrangement and combination of parts herein shown and described and more particularly pointed out in the claims.

Figure 2:
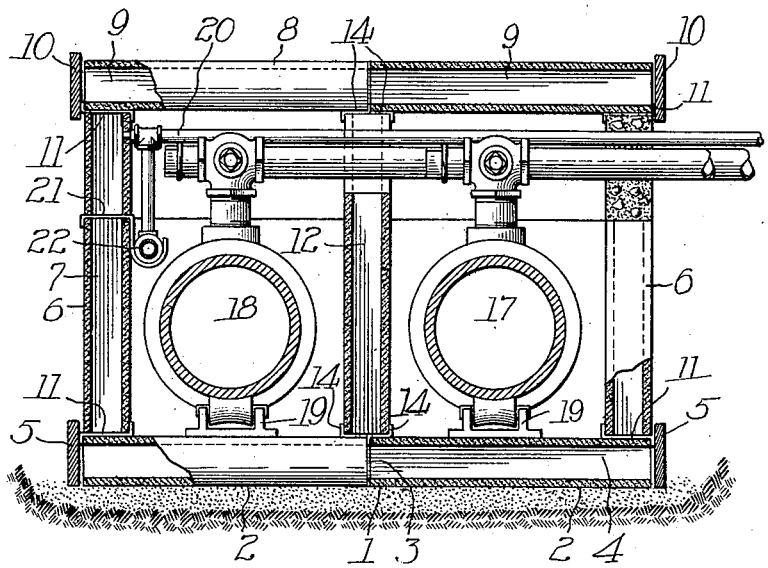
Figure 1:
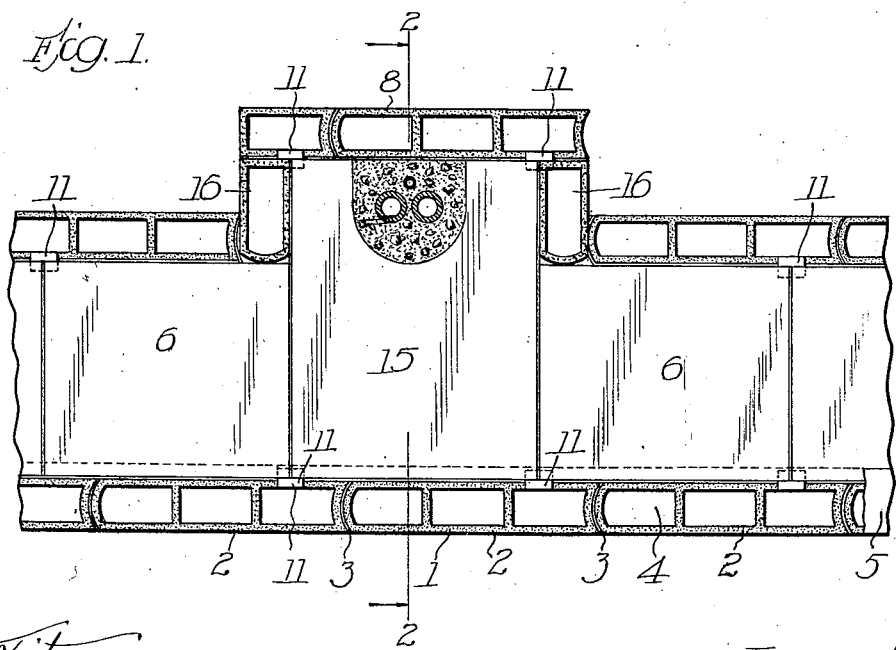

In the accompanying drawings wherein like or similar reference characters indicate like or corresponding parts: Figure 1, is a side elevation of our conduit. Fig. 2, is a section taken substantially on line 2—2 of Fig. 1. Fig. 3, is a section similar to Fig. 2, but showing a conduit adapted for a single main pipe. Fig. 4, is a section taken substantially on line 4—4 of Fig. 3. Fig. 5, is an enlarged detail of the junction of the top and side of our conduit. Fig. 6, is a perspective view of a convenient form of hook for gaging the distance between the walls and retaining the members in position. Fig. 7, is a perspective view of a slightly modified form of our device. Fig. 8 is a section taken substantially on line 8—8 of Fig. 7. Fig. 9, is an enlarged detail of the junction of the top and side of our device showing a convenient arrangement for supporting an auxiliary pipe or conductor in position. Fig. 10, is a manhole or an enlarged portion of a conduit adapted to afford access to valves or other portions of the conductors positioned in the conduit.

In the preferred construction shown, a suitable base or floor 1 is provided of any desired form or construction to support the conductor in position and serve as a bed or foundation for the conduit.

In the form shown in Figs. 1 to 6, the base 1 consists of a series of flat tubular tiles or members 2—2 arranged to form a continuous flat floor with the spaces 3 between the several members sealed with a suitable putty or cement adapted to form a substantially air and liquid tight joint. The members 2 may be of any desired form or construction and arranged in any desired manner. As shown, each tile or member 2, is substantially rectangular in form and provided with one or more openings or passages 4, extending lengthwise therethrough substantially parallel to the sides of the member. In the form shown, each member is positioned so that the openings or passages 4 extend transversely of the base 1 and a strip of wood or other suitable material is provided extending along each side of the base 1, to close the ends of the passages 4 and prevent the entrance of sand or earth into the passages when the trench in which the conduit is positioned is filled in.

The sides and top of our conduit may be formed in any desired manner. As shown, each consists of a series of flat tubular members or tiles 6 and 8 respectively, preferably of the same general form and construction as the members 2. The side walls are preferably mounted upon the base 1 near its edges with the openings 7 in the several members 6 extending vertically or transversely of the conduit, so that when the top members 8 are in position both ends of the openings 7 will be closed, thereby providing a series of separate air chambers in the walls. The top or cover is preferably constructed substantially the same as the base 1 with the openings 9 closed at their ends, if desired, by a suitable strip or board 10.

Any suitable means may be provided to determine the distance between the side walls 6 and to retain the walls in position. As shown a Z shaped hook is provided adapted to coöperate with the base and top members for this purpose. One end of each hook is arranged to engage the ends of the base or top members as the case may be; the body portion of the hook extends across the end of the side member 6, and the opposite end engages the inner face of a side member so that the pressure of the earth against the outside surface of the side members 6 will be transmitted by the hooks 11 to the ends of the bottom and top members 2 and 8 respectively. As shown the hooks 11 are each arranged at the junction of two of the side members and are of sufficient width to engage a suitable portion of both side members. The engagement of the hooks with the ends of the bottom and top members tends to prevent the displacement of these members, and as each side member is engaged at its four corners by the hooks the several parts are accurately maintained in position.

In the form shown in Fig. 2 a single conduit is provided for both the flow and return mains of a heating system. In this form owing to the difference in temperature of the fluid in the mains, it is found to be desirable to insulate them from each other. For this purpose a wall 12 is preferably provided intermediate the side walls 6, constructed in substantially the same manner as the walls 6. Where it is desired to provide a conduit of this form it is usually more convenient to construct both the top and the base of two series of short tiles or members each of suitable length to extend from the outer edge of a side wall 6 to the center of the wall 12. If preferred a plurality of hooks 14—14 may be provided with one end of each hook positioned in the opening between the series of tile forming the top or base as the case may be and the opposite end of the hook arranged to engage the side of the wall 12. The hooks are preferably arranged to alternately engage the opposite sides of the wall 12 as shown, thereby accurately determining the position of the wall 12 and preventing its movement in either direction.

Where it is desired to provide a service connection or other fitting upon the main, requiring increased distance between the base 1 and top 8 of the conduit, we merely provide one or more side members 15 of sufficient length to secure the desired height, and position a member 16 transversely at each side of the members 15 to close the opening between the members 8 upon the members 15 and the members 8 upon the members 6.

The mains 17 and 18 may be supported in the conduit in any desired manner. In the form shown, a plurality of suitably formed chairs or bearings 19 are provided, each adapted to rest upon the base or floor 1 to support each main. Where it is desired to position small air pipes or other conductors 20 in the conduit a suitable bracket 21 may be provided having a part adapted to engage the side wall 6 or other convenient portion of the conduit and a depending hook 22 positioned in the conduit to support the conductor 20 in position.

In Figs. 7 and 8 a form of our device is shown adapted for use where a foundation or base of greater strength and rigidity is required. In this form the base 23 consists of a solid block of concrete, preferably formed in place and provided at each edge with a depression 24 of suitable width to receive the ends of the side members 6' and gage the distance between them, the remaining portions of the conduit are formed substantially as hereinbefore described and requires no further explanation.

Where an enlargement or manhole is required to afford access to valves or other fittings upon the mains or other portions of the conductors, a suitable base or bottom 25 of cinders, concrete or other suitable material is provided and side walls 26 are mounted upon or arranged to inclose the base 25. The members comprising the side walls 26 may be of any desired form, size or construction, adapted for the purpose, but are preferably tubular tile of the same general construction as hereinbefore described. A frame of suitable steel beams 27 or equivalent means may be provided at the top of the manhole arranged to support a manhole ring 28 and cover 29 of the usual or any preferred construction in position. The space between the ring 28 and the walls 26 is filled in the usual manner with tile or masonry to suit the conditions.

Having thus described our improvement it is obvious that various immaterial modifications may be made in our device without departing from the spirit of our invention hence we do not wish to be understood as limiting ourselves to the exact form or construction shown.

What we claim as new and desire to secure by Letters Patent is:

1. A conduit comprising a base, a plurality of series of members arranged to form a plurality of walls upon said base and to cover the space between said walls, each of said members comprising a pair of substantially parallel plates suitably spaced from each other connected by a plurality of distance pieces extending transversely of said conduit.

2. A conduit comprising a base, a plurality of series of substantially similar members arranged to form a plurality of walls upon said base and to cover the space between said walls, each of said members comprising a pair of substantially parallel plates suitably spaced from each other connected at their opposite edges only by distance pieces extending transversely of said conduit, in combination with means adapted to determine the distance between said walls and to retain said members in position.

3. A conduit comprising a base, a plurality of series of members arranged to form a plurality of walls upon said base and to cover the space between said walls, each of said members comprising a pair of substantially parallel plates of uniform thickness suitably spaced from each other, connected by a plurality of distance pieces extending transversely of said conduit.

4. A conduit comprising a base, a plurality of series of substantially similar members arranged to form a plurality of walls upon said base and to cover the space between said walls, each of said members comprising a pair of substantially parallel plates suitably spaced from each other connected by a plurality of distance pieces of substantially the same thickness as said plates extending transversely of said conduit.

5. A conduit comprising a base, a plurality of series of members arranged to form a plurality of walls upon said base and to cover the space between said walls, each of said members comprising a pair of substantially parallel plates suitably spaced from each other connected by a pair of substantially parallel distance pieces extending transversely of said conduit, in combination with means adapted to retain said members in position.

6. A conduit comprising a base, a plurality of series of members arranged to form a plurality of walls upon said base and to cover the space between said walls, in combination with a plurality of Z shaped hooks adapted to engage said base and cover to determine the distance between said walls and retain said members in position.

7. A conduit comprising a base, a plurality of series of substantially similar members arranged to form a plurality of walls upon said base and to cover the space between said walls, each of said members comprising a pair of substantially parallel plates of uniform thickness suitably spaced from each other connected at their opposite edges only by distance pieces extending transversely of said conduit, in combination with means adapted to retain said members in position.

8. A conduit comprising a base, a plurality of series of members arranged to form a plurality of walls upon said base and to cover the space between said walls, each of said members comprising a pair of substantially parallel plates of uniform thickness suitably spaced from each other, connected at their opposite edges only by distance pieces of substantially the same thickness as said plates extending transversely of said conduit, in combination with means adapted to retain said members in position.

9. A conduit comprising a base, a plurality of series of members arranged to form a plurality of walls upon said base and to cover the space between said walls, each of said members comprising a pair of substantially parallel plates of uniform thickness suitably spaced from each other, connected at their opposite edges by a pair of substantially parallel distance pieces of substantially the same thickness as said plates extending only transversely of said conduit, in combination with means adapted to rigidly retain said members in position.

10. A conduit comprising a base formed of a series of flat tubular members, a plurality of series of substantially similar tubular members arranged to form a plurality of walls upon said base and to cover the space between said walls, the openings in said members extending transversely of said conduit, in combination with a plurality of Z shaped hooks adapted to engage said base and cover to gage the distance between said walls and to retain said members in position.

11. A conduit comprising a base formed of a series of flat tubular members, a plurality of series of members arranged to form a plurality of walls upon said base and to cover the space between said walls, in combination with a plurality of Z shaped hooks adapted to engage said base and cover to determine the distance between said walls and to retain said members in position.

12. A conduit comprising a base, a plurality of series of substantially similar tubular members arranged to form a plurality of walls upon said base and to cover the space between said walls, the passage through each of said members extending transversely of said conduit, and means for securing said members in position.

13. A conduit comprising a base, a plurality of series of members arranged to form a plurality of walls upon said base and to cover the space between said walls, each of said members comprising a pair of substantially parallel plates of uniform thickness suitably spaced from each other, connected by a pair of substantially parallel distance pieces extending transversely of said conduit, in combination with means adapted to determine the distance between said walls and to retain said members in position.

14. A conduit comprising a base, a plurality of series of members arranged to form a plurality of walls upon said base and to cover the space between said walls, each of said members comprising a pair of substantially parallel plates of uniform thickness suitably spaced from each other, connected by a plurality of distance pieces of substantially the same thickness as said plates extending transversely of said conduit, in combination with means adapted to determine the distance between said walls and to retain said members in position.

15. A conduit comprising a base, a plurality of series of tubular members arranged to form a plurality of walls upon said base and to cover the space between said walls, in combination with a plurality of Z shaped hooks adapted to engage said base and cover to determine the distance between said walls and to retain said members in position.

16. A conduit comprising a base formed of a series of flat tubular members, a plurality of series of substantially similar tubular members arranged to form a plurality of walls upon said base and to cover the space between said walls, the passage through each of said members extending transversely of said conduit, and means for rigidly retaining said members in position.

17. A conduit comprising a base, a plurality of series of members arranged to form a plurality of walls upon said base and to cover the space between said walls, each of said members comprising a pair of substantially parallel plates suitably spaced from each other by a pair of substantially parallel distance pieces of the same thickness of said plates extending transversely of said conduit, in combination with means adapted to retain said members in position.

18. A conduit comprising a base, a plurality of series of substantially similar tubular members arranged to form a plurality of walls upon said base and to cover the space between said walls the openings in said members extending transversely of said conduit, in combination with a plurality of Z shaped hooks adapted to engage said base and cover to gage the distance between said walls and to retain said members in position.

In testimony whereof, we have hereunto signed our names in the presence of two subscribing witnesses.

ARTHUR E. DURAM.
FREDERIC B. HOFFT.

Witnesses:
BLANCHE CHALMERS,
BURTON U. HILLS.

---

Copies of this patent may be obtained for five cents each, by addressing the "Commissioner of Patents, Washington, D. C."